United States Patent [19]
Redman et al.

[11] Patent Number: 5,468,018
[45] Date of Patent: Nov. 21, 1995

[54] TORQUE BOX ASSEMBLY FOR A VEHICLE

[75] Inventors: Forrest C. Redman, Lapeer; John O. Heimbecher, Berkley; Edwin L. Etnyre, Warren; James J. Shavrnoch, Frankenmuth; Paul A. Ferranti, Macomb, all of Mich.

[73] Assignee: Chrysler Corporation, Highland Park, Mich.

[21] Appl. No.: 313,621

[22] Filed: Sep. 27, 1994

[51] Int. Cl.⁶ .................................................. B62D 7/22
[52] U.S. Cl. ........................ 280/788; 296/204; 280/690
[58] Field of Search .................................. 280/788, 701, 280/690, 700; 296/204; 180/53.8

[56] References Cited

U.S. PATENT DOCUMENTS

| | | | |
|---|---|---|---|
| 4,150,842 | 4/1979 | Hamada et al. | 296/204 X |
| 4,269,432 | 5/1981 | Inoue et al. | 280/690 |
| 5,087,074 | 2/1992 | Komatsu et al. | 280/788 |
| 5,320,403 | 6/1994 | Kazyak | 296/203 |

FOREIGN PATENT DOCUMENTS 209605  12/1983  Japan ........................... 280/690

Primary Examiner—Robert J. Oberleitner
Assistant Examiner—Peter M. Poon
Attorney, Agent, or Firm—Christopher A. Taravella

[57] ABSTRACT

A torque box assembly for mounting between a vehicle frame side rail and a body side sill for supporting a rear suspension trailing link. The torque box assembly includes two interconnected box members and two mounting flanges, with the trailing link resiliently connected to one of the box members.

13 Claims, 4 Drawing Sheets

TORQUE BOX ASSEMBLY FOR A VEHICLE

FIELD OF THE INVENTION

This invention relates generally to vehicle frames and body side sills and, more particularly, to a torque box assembly therebetween for resiliently supporting an end of a rear suspension trailing link.

BACKGROUND OF THE INVENTION

A known torque box arrangement is disclosed in Kazyak U.S. Pat. No. 5,320,403, wherein a pair of such torque boxes provide a connection between front and passenger compartment structural subassemblies of a vehicle space frame.

Another known torque box assembly is illustrated in FIGS. 7 and 9, and will be described later.

SUMMARY OF THE INVENTION

A general object of the invention is to provide an improved torque box assembly for use on a vehicle frame.

Another object of the invention is to provide a rear underbody torque box assembly which retains a rear suspension trailing link; provides torsional stiffness to the vehicle; provides a hoist point at the rear of the vehicle; provides an attachment point for tie-down chains used on rail and truck carriers; and which is installed on the vehicle out of the underbody air stream, reducing drag.

A further object of the invention is to provide a torque box assembly including first and second interconnected boxes secured among a vehicle side rail, floor pan, and body side sill.

A still further object of the invention is to provide a plate member secured to a vehicle side rail and having a center opening with a first box secured around the opening, a second box having a bottom wall secured to the plate member and side walls secured to a floor pan and body side sill, with a resilient end assembly of a rear suspension trailing link secured to the first box, such that no distortion occurs in the desired width between the frame side rail and the body side sill, to cause non-uniform gaps between adjacent body parts.

These and other objects and advantages will become more apparent when reference is made to the following drawings and the accompanying description.

BEST MODE FOR CARRYING OUT THE INVENTION

Figure 1:
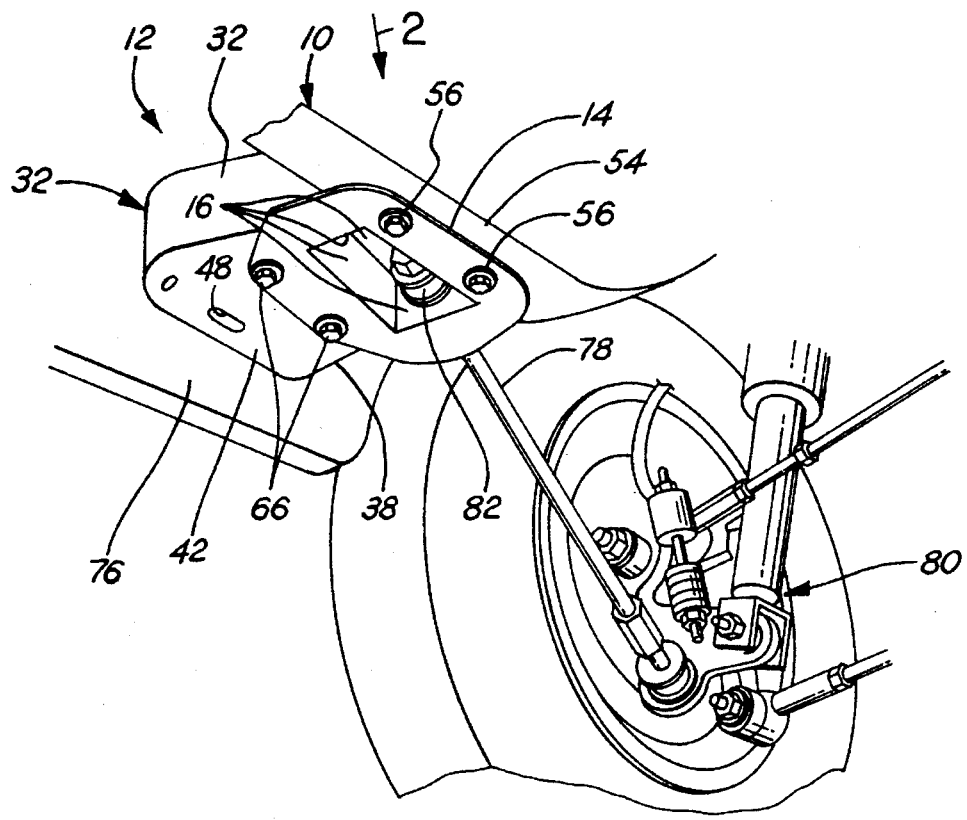
FIG. 1 is a fragmentary perspective view of a vehicle embodying the invention.

Referring now to the drawings in greater detail FIGS. 1–6 illustrate a vehicle frame 10 having rear underbody torque box assembly 12 mounted thereon.

Figure 2:
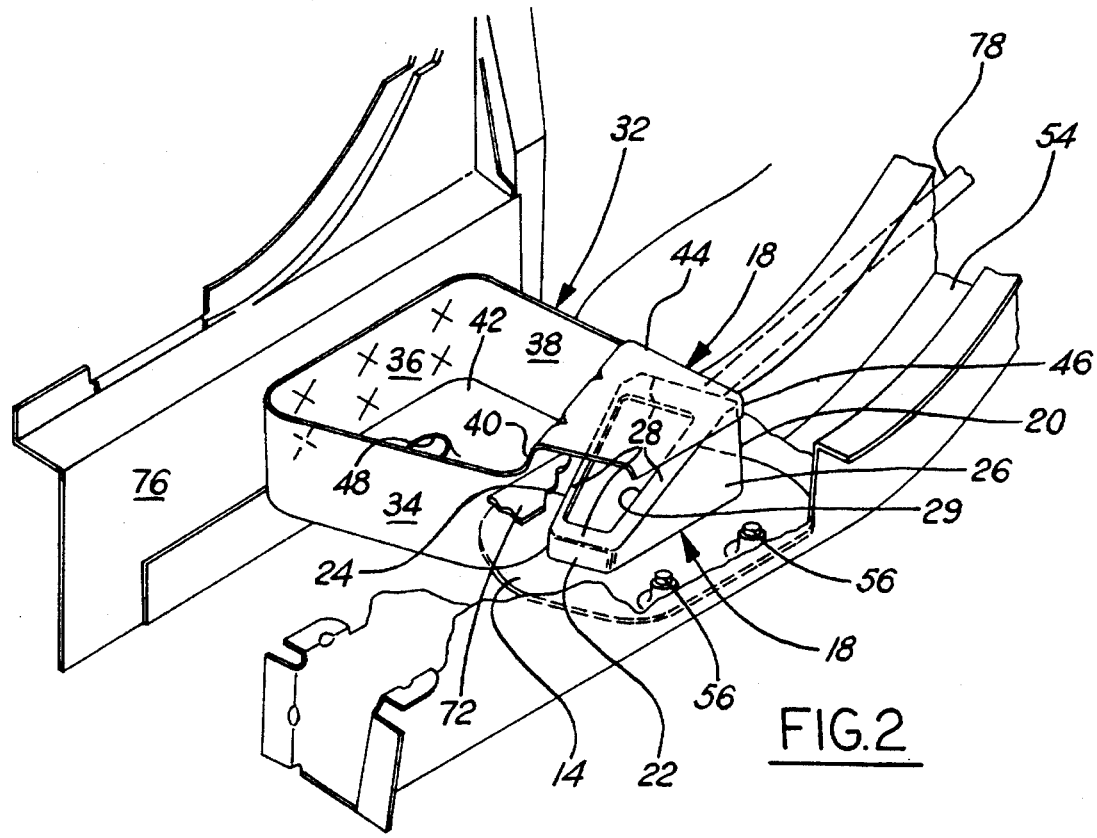
FIG. 2 is a perspective top view of the FIG. 1 structure.
Figure 3:
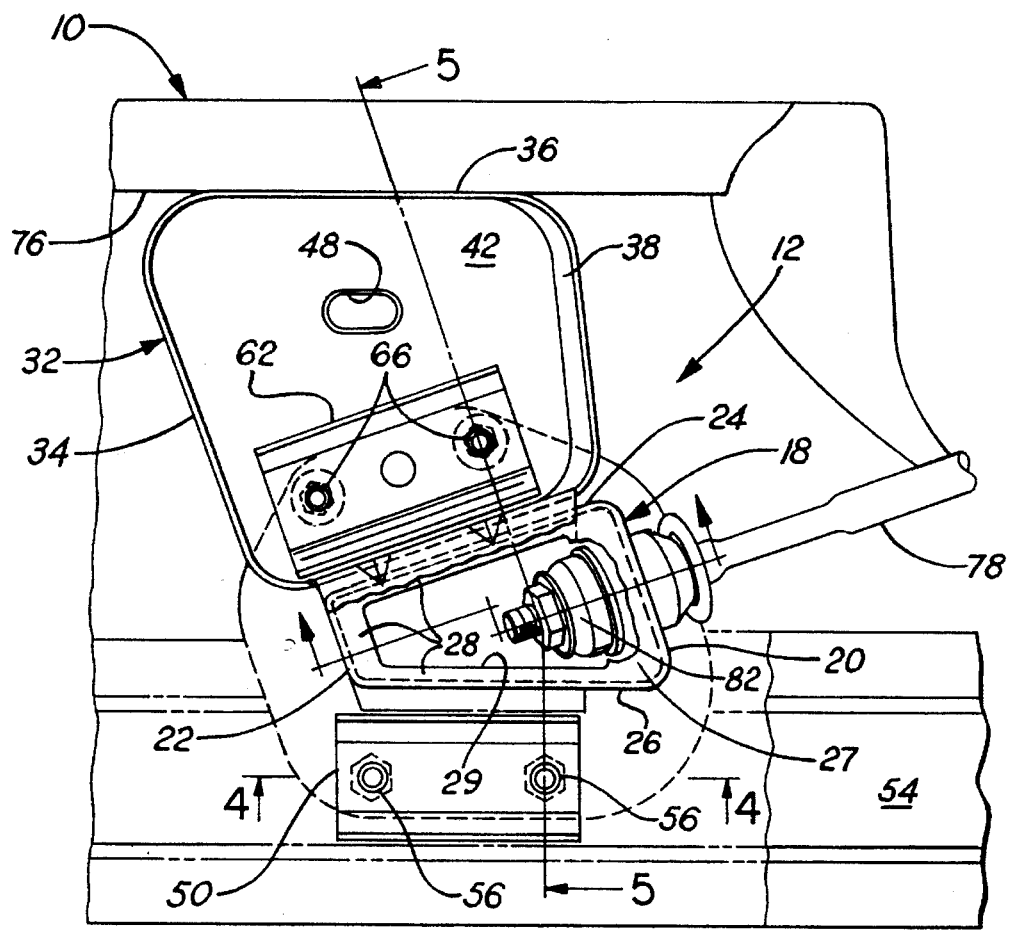
FIG. 3 is an enlarged plan view, partially broken away, of the FIG. 2 structure.
Figure 4:
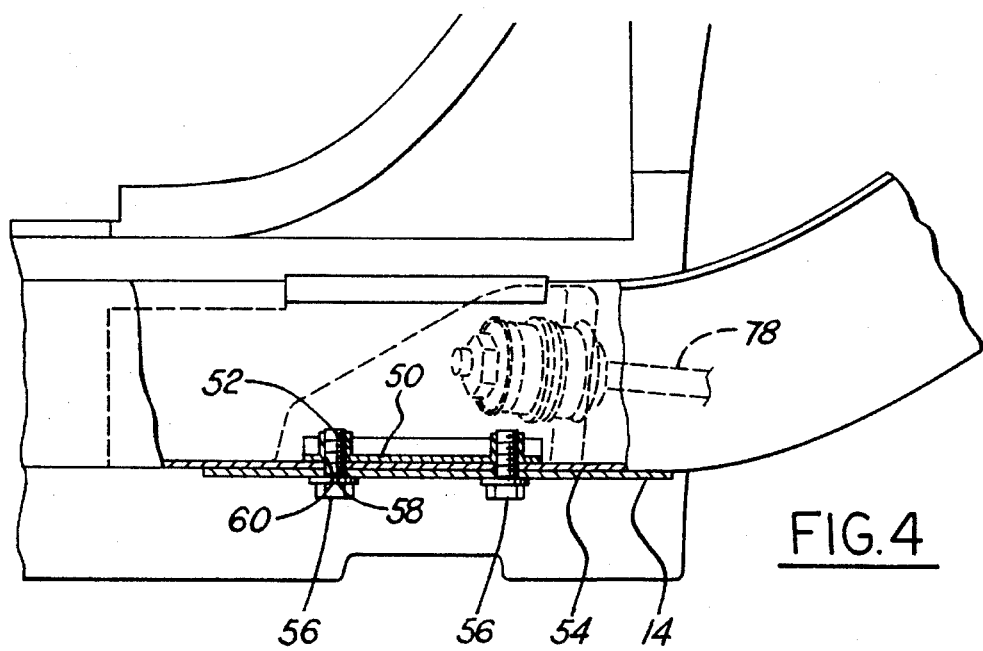
FIG. 4, 5, and 6 are cross-sectional views taken along the planes of the respective lines 4—4, 5—5, and 6—6 of FIG. 3, and looking in the directions of the arrows.
Figure 6:
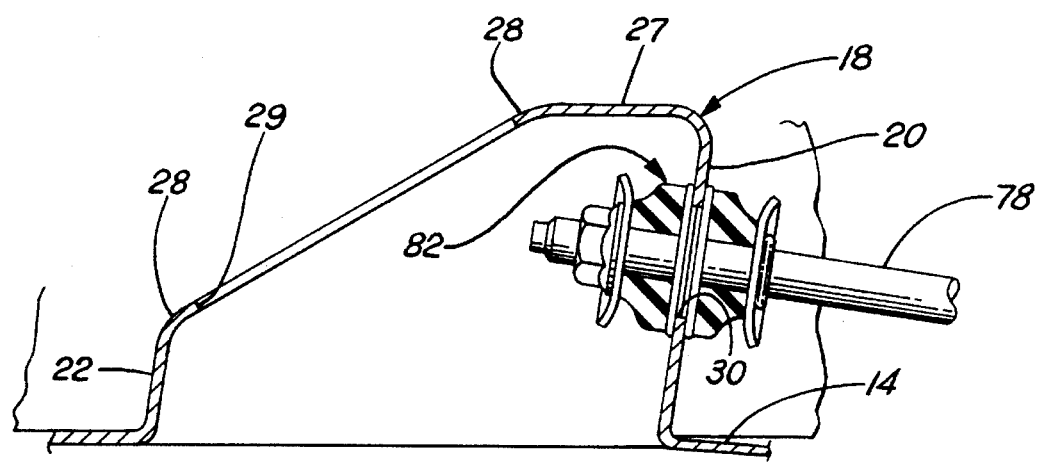

The torque box assembly 12 includes a plate member 14 having a four-sided opening 16 formed in the center portion thereof, and a first four-sided box 18 (FIG. 2) mounted on the plate member around the edge of the opening. The box 18 includes a rear wall 20, a shorter front wall 22, two tapered side walls 24 and 26 interconnecting the front and rear walls, and a lateral flange 27 (FIGS. 3 and 6) between the rear wall 20 and rear portions of the side walls 26 and 24 interconnected inturned co-planar flanges 28 are formed at the top edges of the flange 27 and the three walls 22, 24 and 26, forming an opening 29 (FIGS. 2, 3 and 6). An opening 30 (FIG. 6) is formed in the rear wall 20.

A second four-sided box 32 includes three equal height walls 34, 36 and 38, a fourth higher wall 40 (FIGS. 2 and 5), and a bottom wall 42. An outwardly extending flange 44 (FIGS. 2 and 5) is formed on the upper edge of the fourth wall 40, and a down-turned edge 46 (FIGS. 2 and 5) is formed on the free end of the flange 44. A small oval opening 48 is formed in the bottom wall 42, serving as a locking receptacle for a suitable bolt (not shown) for securing thereto tie down chains used on rail and truck carriers.

A first mounting bracket 50 (FIGS. 3–5) having a pair of threaded openings 52 formed therein is mounted on a side rail 54 (FIGS. 1–5) of the frame 10. A pair of bolts 56 extend through aligned openings 58 and 60 (FIGS. 4 and 5) in the plate member 14 and the side rail 54, respectively, into the threaded openings 52.

A second mounting bracket 62 (FIGS. 3 and 5) having a pair of threaded openings 64 formed therein is mounted on the bottom wall 42. A pair of bolts 66 extend through aligned openings 68 and 70 (FIG. 5) in the plate member 14 and the bottom wall 42, respectively, into the threaded openings 64.

Figure 5:
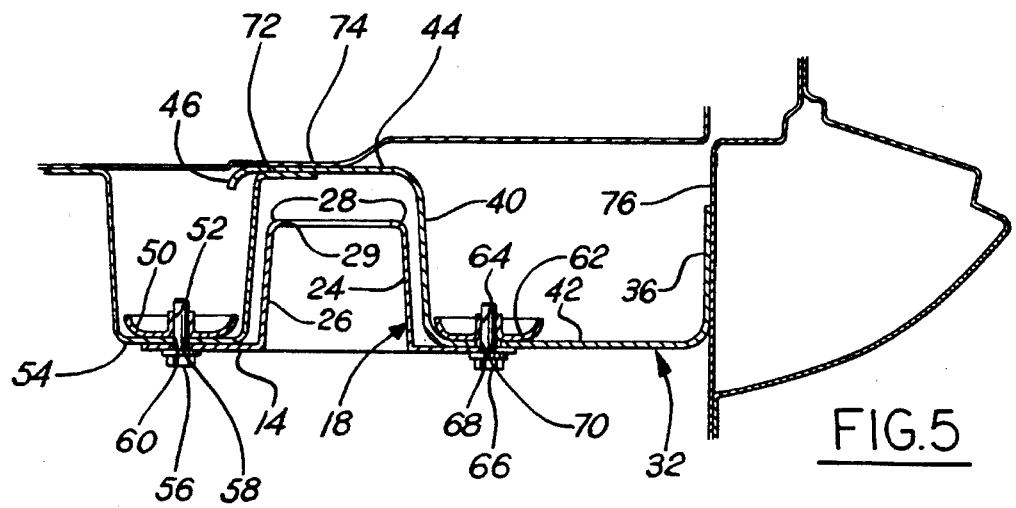

As best seen in FIG. 5, the flange 44 extending from the wall 40 of the box 32 is secured between a side rail flange 72 and a floor pan 74, such as by spot-welding. For the vehicle selected herein, the side rail flange 72 is an extension of the side rail 54. As noted in FIG. 3, the wall 36 of the box 32 is secured to a body side sill 76 (FIGS. 2 and 3), such as by spot-welding.

A rear suspension trailing link 78 (FIGS. 1, 3 and 6) extends from a wheel assembly 80 (FIG. 1) to a resilient end assembly 82 (FIGS. 1, 3 and 6) mounted in the opening 30 (FIG. 6) in the rear wall 20 so as to extend into the box 18.

Figure 7:
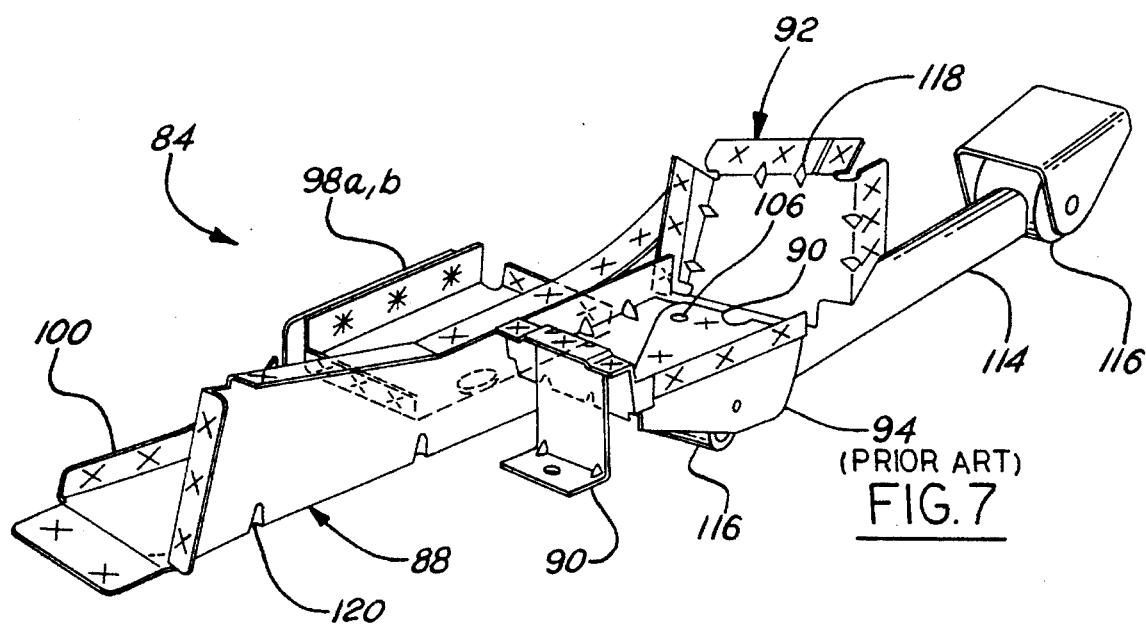
FIG. 7 is a perspective view of a prior art arrangement.
Figure 8:
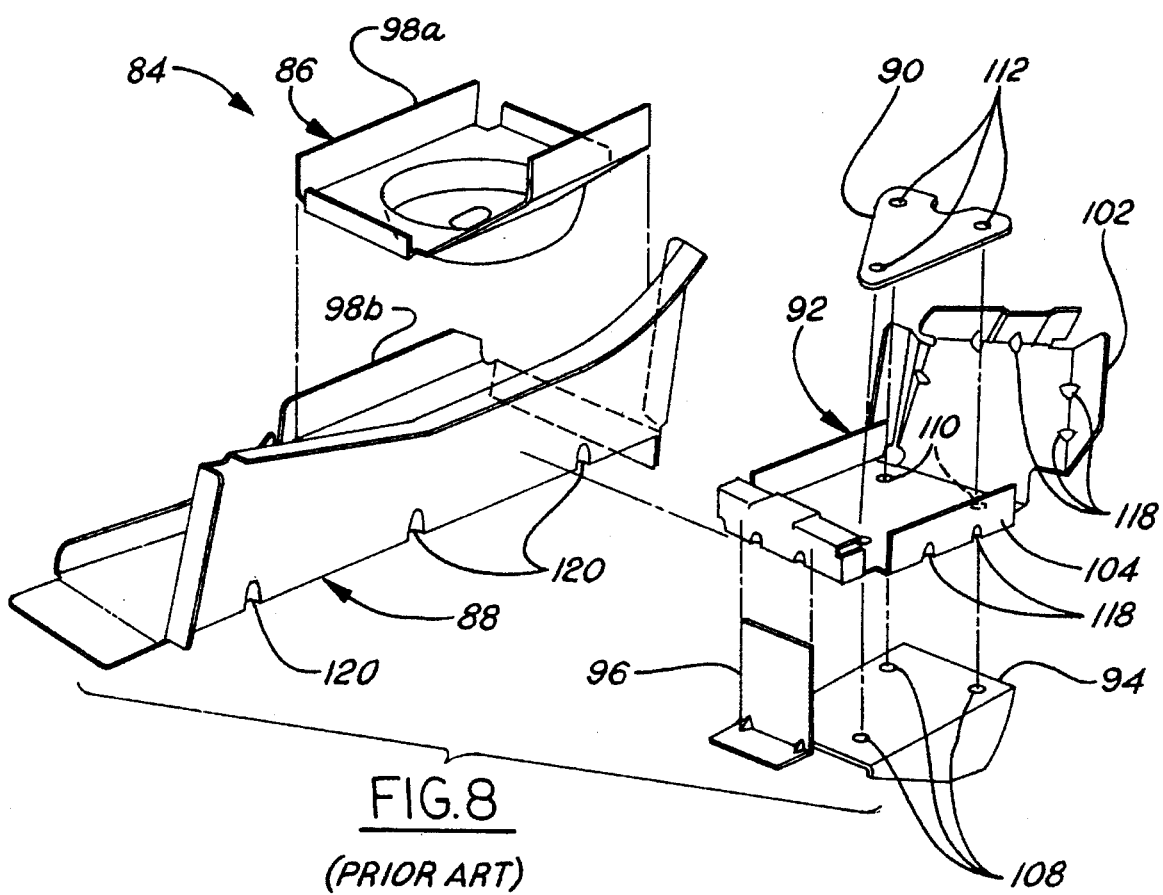
FIG. 8 is an exploded perspective view of the FIG. 7 structure.

Referring now to FIGS. 7 and 8, there is illustrated the above referenced known prior art torque box assembly 84. The assembly 84 includes six components 86, 88, 90, 92, 94 and 96 (FIG. 8). As indicated in FIG. 7 by rows of x's and asterisks, the six weld stations are required to complete the assembly on the vehicle, some for securing one part of the assembly to another, with flanges 98a/98b, and 100 being spot-welded to the vehicle outer side sill (not shown), and flanges 102 and 104 being spot-welded to the vehicle side rail of the frame (not shown). Bolts indicated at 106 in FIG. 7, extend upwardly through openings 108 and 110 (FIG. 8) formed in the components through openings 108 and 110 (FIG. 8) formed in the components 94 and 92, respectively, into threaded holes 112 formed in the tap plate component 90. A trailing link 114 (FIG. 7) is confined between pivotally mounted cylindrical rubber bushings 116 at the ends thereof, the front one being connected to the component 94. A plurality of strengthening darts 118 and 120 are formed by pressing in selected points along corners of the components 92 and 88, respectively. In contrast, the torque box assembly 12 consists of two box members 18 and 34 and two mounting brackets 50 and 62, and requires spot-welding at only two stations, i.e., between the wall 36 and the body side sill 76 (FIG. 2), and through the flange 44 confined between the side rail flange 72 and the floor pan 74 (FIG. 5).

INDUSTRIAL APPLICABILITY

It should be apparent that the torque box assembly invention provides several functions, including serving as a retention means for the rear suspension trailing link; providing torsional stiffness to the vehicle; providing a hoist point on the rear of the vehicle; and providing an attachment location for rear shipping tie-down chains used on rail and truck hauling units. It also is mounted out of the underbody air stream, thus reducing drag, fitting nicely between the frame side rail and body side sill, without causing any distortion in the width therebetween.

It should also be apparent that the invention provides a compact, light-weight, and easily manufactured torque box assembly.

While but one embodiment of the invention has been shown and described, other modifications in individual part shapes and sizes are possible as required to suit different vehicle frame requirements.

What is claimed is:

1. A torque box assembly for a vehicle having side rails, floor pan, and body side sills, a rear suspension trailing link with a resilient end assembly, said torque box assembly comprising a first box including four walls formed on a plate member, said rear suspension trailing link having its resilient end assembly mounted in an opening formed in one of said four walls, a second box including four walls and a bottom wall, first fastener means for securing said bottom wall to said plate member, and second fastener means for securing said plate member to at least one of said side rails.

2. The torque box assembly described in claim 1, and an out-turned flange formed on the free edge of one wall of said four walls of said second box and secured between a flange on one of said side rails and said floor pan, and the wall opposite said one wall is secured to at least one of said body side sills.

3. The torque box assembly described in claim 2, and a first mounting bracket on said bottom wall for receiving said first fastener means, and a second mounting bracket on at least one of said side rails for receiving said second fastener means.

4. The torque box assembly described in claim 3, wherein said second box includes three equal height walls and a fourth higher wall, with said out-turned flange being formed on said higher wall.

5. The torque box assembly described in claim 2, wherein said out-turned flange is spot-welded between said floor pan and said flange of one of said side rails.

6. The torque box assembly described in claim 1, wherein said first and second fastener means are connected through said plate member on oppositely disposed sides of said first box.

7. The torque box assembly described in claim 1, wherein a four-sided opening is formed in the center of said plate member and said four walls of said first box, said first box extends around said four-sided opening.

8. The torque box assembly described in claim 1, wherein said first box includes one rear wall, one shorter front wall, and two oppositely disposed tapered side walls inter-connecting the rear and front walls.

9. The torque box assembly described in claim 8, and interconnected inturned flanges formed on the four walls of said first box, forming a sloped four-sided opening therebetween.

10. The torque box assembly described in claim 8, wherein said opening is formed in said rear wall, and said resilient end assembly is mounted therein so as to extend into said first box.

11. The torque box assembly described in claim 1, wherein each of said first and second fastener means includes a bracket having a pair of threaded openings formed therein, and a pair of bolts extended through each of a pair of openings in said plate member and said bottom wall and a pair of openings in said plate member and at least one of said side rails, respectively, into said threaded openings.

12. The torque box assembly described in claim 1, and at least one opening formed in said bottom wall as a hoist point and/or a tie-down chain attachment point.

13. The torque box assembly described in claim 1, wherein one of said four walls of said first box is spot-welded to at least one of said body side sills.

\* \* \* \* \*